(12) United States Patent
Picon et al.

(10) Patent No.: US 11,273,529 B2
(45) Date of Patent: Mar. 15, 2022

(54) TOOL MAGAZINE AND METHOD FOR CHANGING TOOLS

(71) Applicant: Rollomatic S.A., Le Landeron (CH)

(72) Inventors: Fabien Picon, La Neuveville (CH); Frédéric Buerli, Morges (CH)

(73) Assignee: Rollomatic S.A., Le Landeron (CH)

( * ) Notice: Subject to any disclaimer, the term of this patent is extended or adjusted under 35 U.S.C. 154(b) by 0 days.

(21) Appl. No.: 16/630,910

(22) PCT Filed: Sep. 4, 2018

(86) PCT No.: PCT/EP2018/073770
§ 371 (c)(1),
(2) Date: Jan. 14, 2020

(87) PCT Pub. No.: WO2019/052859
PCT Pub. Date: Mar. 21, 2019

(65) Prior Publication Data
US 2020/0269371 A1    Aug. 27, 2020

(30) Foreign Application Priority Data

Sep. 14, 2017   (EP) .................................. 17190992

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15539* (2016.11); *B23Q 3/15722* (2016.11);
(Continued)

(58) Field of Classification Search
CPC ........... Y10T 483/1748; Y10T 483/175; Y10T 483/1783; Y10T 483/1786;
(Continued)

(56) References Cited

U.S. PATENT DOCUMENTS 3,273,235 A * 9/1966 Dziedzic ............ B23Q 3/15773
483/48
3,546,774 A * 12/1970 Holzl ................. B23Q 3/15539
483/48
(Continued)

FOREIGN PATENT DOCUMENTS

DE   10 2014 218899 A1    3/2016
EP        0319914 A1 *   6/1989   ......... B23Q 3/15536
(Continued)

OTHER PUBLICATIONS

International Search Report in PCT/EP2018/073770, dated Dec. 14, 2018.
(Continued)

Primary Examiner — Erica E Cadugan
Assistant Examiner — Michael Vitale
(74) Attorney, Agent, or Firm — Collard & Roe, P.C.

(57) ABSTRACT

A tool magazine receives a plurality of tools which are provided for arrangement on a tool spindle of a machine tool, and a method for changing tools using a tool magazine. The tool magazine exhibits a guide rail arranged in a fixed position on a machine base, a magazine carriage displaceably mounted on the guide rail, a rotary drive arranged on the magazine carriage and having a magazine shaft which can be rotated around a shaft axis of rotation, at least two magazine wheels arranged non-rotatably on the magazine shaft and having a plurality of tool holders, and a transfer device linearly displaceable along a transfer axis transverse to the guide rail and which picks up a tool arranged on one of the tool holders of the magazine wheels and transports the tool to the tool spindle and back.

18 Claims, 10 Drawing Sheets

(52) U.S. Cl.
CPC .................. *B23Q 3/15766* (2013.01); *B23Q 2003/15537* (2016.11); *B23Q 2003/155407* (2016.11); *Y10T 483/10* (2015.01); *Y10T 483/1783* (2015.01); *Y10T 483/1882* (2015.01)

(58) Field of Classification Search
CPC ......... Y10T 483/1788; Y10T 483/1845; Y10T 483/1855; Y10T 483/1873; Y10T 483/1882; B23Q 3/15573; B23Q 3/15713; B23Q 3/15733; B23Q 3/1574; B23Q 2003/155404; B23Q 2003/155407; B23Q 2003/155435; B23Q 2003/155439; B23Q 3/15539; B23Q 3/15722; B23Q 3/15766; B23Q 2003/15537
USPC ......... 483/36, 37, 51, 52, 53, 63, 64, 66, 67
See application file for complete search history.

(56) References Cited

U.S. PATENT DOCUMENTS

| | | | | | |
|---|---|---|---|---|---|
| 4,344,221 | A | * | 8/1982 | Pagani | B23Q 3/15539 483/8 |
| 4,759,115 | A | * | 7/1988 | Kielma | B23Q 3/15713 483/32 |
| 5,242,359 | A | * | 9/1993 | Obrist | B23Q 7/1426 483/1 |
| 2013/0095988 | A1 | * | 4/2013 | Mayr | B23Q 5/40 483/49 |
| 2014/0342889 | A1 | * | 11/2014 | Kraft | B23Q 3/15503 483/1 |
| 2017/0282316 | A1 | | 10/2017 | Schmieder et al. | |

FOREIGN PATENT DOCUMENTS

| | | | | |
|---|---|---|---|---|
| EP | 2 567 783 A1 | | 3/2013 | |
| JP | 60146638 A | * | 8/1985 | ......... B23Q 3/15539 |
| JP | 63144926 A | * | 6/1988 | ............ B23Q 3/157 |
| TW | M528226 U | | 9/2016 | |

OTHER PUBLICATIONS

European Office Action in EP 17190992.2-1016, dated Mar. 7, 2018, with English translation of relevant parts.

English translation of the International Preliminary Report on Patentability and Written Opinion of the International Searching Authority in PCT/EP2018/073770, dated Mar. 26, 2020.

English translation of Taiwanese Office Action in TW 107132434, dated Nov. 1, 2021.

* cited by examiner

TOOL MAGAZINE AND METHOD FOR CHANGING TOOLS

CROSS REFERENCE TO RELATED APPLICATIONS

This application is the National Stage of PCT/EP2018/073770 filed on Sep. 4, 2018, which claims priority under 35 U.S.C. § 119 of European Application No. 17190992.2 filed on Sep. 14, 2017, the disclosure of which is incorporated by reference. The international application under PCT article 21(2) was not published in English.

DESCRIPTION

The invention relates to a tool magazine for receiving a plurality of tools which are provided for arrangement on a tool spindle of a machine tool, and a method for changing tools using said tool magazine.

Machine tools with a tool spindle are used in the metal-cutting machining of workpieces, such as drilling, milling, grinding, turning, polishing and thread cutting. Frequently, different tools are required for the machining of workpieces. These tools are placed on the tool spindle according to the machining process. The tools required for machining are made available in a tool magazine. The tool magazine is equipped with a transfer device. The transfer device removes from the tool spindle a first tool already arranged on the tool spindle, transports it to the tool magazine and sets it down there, removes a second tool from the tool magazine, transports it to the tool spindle and arranges it on the tool spindle. Such a tool magazine is known from EP 2567783 A1. The publication discloses a tool magazine for a grinding machine. The tool magazine is equipped with a magazine wheel that can be rotated around a machine tool axis that is parallel to the grinding spindle axis. The magazine wheel exhibits a plurality of holders, each of which receives a tool. A transfer device is displaceably arranged. The transfer device is moved back and forth between the grinding spindle and the magazine wheel in a transfer direction running perpendicular to the grinding spindle axis. It removes a tool from the grinding spindle and exchanges it for a tool from the tool magazine. The magazine wheel is rotated in order to position either a free holder or a tool in such a way that a transfer of the tool from the transfer device to the magazine wheel or vice versa can take place. The number of tools made available in the tool magazine is prescribed by the magazine wheel. If the number of tools made available is to be increased, the radius of the magazine wheel must be increased. The tool magazine is generally arranged immediately adjacent to the tool spindle on the same machine base and in the same housing. If the radius of the magazine wheel is increased, additional space has to be made available beside the tool spindle. This space is usually not available in the predefined housing. An increase in the radius of the magazine wheel is therefore generally associated with an enlargement of the housing. Since the magazine wheel with its tool magazine axis is arranged parallel to the grinding spindle axis, an increase in the number of tools in the tool magazine means an enlargement of the housing of the machine tool on a plane perpendicular to the tool spindle axis. This in turn means that the machine tool takes up more space when positioned at its place of use.

The object of the invention is to provide a tool magazine and a method for changing tools of a tool magazine that can receive more tools than known tool magazines with a magazine wheel without taking up more space on a plane perpendicular to the axis of the magazine wheel.

This object is achieved by a tool magazine having the features of claim 1. The tool magazine is characterised in that it exhibits a magazine carriage that can be displaced along a guide rail. On the magazine carriage is arranged a rotary drive which transmits a torque to a magazine shaft and rotates the magazine shaft around a shaft axis of rotation. At least two magazine wheels are non-rotatably arranged on the magazine shaft. This means that in a rotation of the magazine shaft the magazine wheels also rotate. The magazine wheels thus all rotate together with the magazine shaft around the shaft axis of rotation. The magazine wheels are arranged side-by-side on the magazine shaft and exhibit a distance in the axial direction. Each of the magazine wheels is equipped with a plurality of tool holders. Each tool holder is able to receive exactly one tool. If there is no tool in a tool holder, the tool holder is referred to as a free tool holder. The tool magazine further exhibits a transfer device displaceably arranged on the machine base. This transfer device can be displaced in and against a transfer direction along a transfer axis back and forth between a tool spindle and the magazine wheels. The transfer direction runs transverse to the guide rail. The transfer axis and the guide rail intersect at a predefined angle. The transfer device picks up a tool arranged on one of the tool holders and transports it in the transfer direction away from the tool holder and towards the tool spindle, where the transfer device sets the tool down. If the tool on the tool spindle is to be exchanged, the transfer devices picks up the tool arranged on the tool spindle, transports it against the transfer direction away from the tool spindle and towards a free tool holder of a magazine wheel, and sets it down on the free tool holder.

In order to increase the number of tool-receiving tool holders in the tool magazine, a plurality of tool wheels is arranged on the magazine shaft. The unit comprising magazine shaft and magazine wheels is arranged together with a rotary drive on a magazine carriage that is displaceably mounted along a guide rail. The radius of each of the magazine wheels can be comparatively large or even smaller than that of the magazine wheels of known tool magazines. The elongation of the tool magazine on a plane perpendicular to the shaft axis of rotation is thus exactly as great or as the case may be even smaller than that of a known tool magazine with one magazine wheel. Since the magazine carriage is displaceably mounted along the guide rail, the magazine shaft is arranged on the carriage and the magazine wheels are arranged on the magazine shaft, in the direction of the shaft axis of rotation the tool magazine exhibits a greater elongation than on known tool magazines with a magazine wheel, but this elongation is parallel to the axis of the tool spindle or at an angle against the axis of the tool spindle. In this direction the machine tool has a great elongation in any case. As long as the elongation of the tool magazine in the direction of the guide rail running essentially parallel or at an angle to the axis of the tool spindle is smaller or as great as the elongation of the machine tool in this direction, a machine tool with the tool magazine according to the invention takes up no more space when positioned at the place of use than a machine tool with a known tool magazine. The tool magazine according to the invention thus allows more tool holders for receiving tools to be provided without a machine tool equipped with the tool magazine taking up more space when positioned at the place of use.

According to an advantageous embodiment of the invention, the transfer device exhibits at least two end positions: a spindle position and a tool change position. In the spindle position the transfer device is in its position located nearest the tool spindle. In this position the transfer device picks up a tool arranged on the tool spindle or sets a tool down on the tool spindle. In the tool change position the transfer device is in its position located nearest the magazine shaft. In particular, in the tool change position a tool-receiving holding device of the transfer device is in its position located nearest the magazine shaft. In the tool change position the transfer device picks up a tool that is arranged on a tool holder of a magazine wheel adjacent to it or sets a tool down on the free tool holder facing it of the magazine wheel. Between the spindle position and the tool change position the transfer device can be displaced linearly in and against the transfer direction.

According to a further advantageous embodiment of the invention, the transfer device exhibits as a third end position an intermediate position which is located between the spindle position and the tool change position. In the intermediate position the transfer device is arranged such that the magazine wheels rotate free of interaction with the transfer device. The transfer device is preferably arranged in this intermediate position after it has set down a first tool on one of the magazine wheels and before it picks up a second tool from the magazine wheel. Between these two actions the magazine shaft is rotated with the magazine wheels so that the second tool is brought into a transfer position in which it can be picked up by the transfer device.

According to a further advantageous embodiment of the invention, the transfer device exhibits an idle position into which the transfer device is moved when a tool change has been completed. The idle position is a further end position of the transfer device. The idle position is removed from the spindle position, so that the transfer device does not impair the machining of the workpiece with the tool spindle equipped with a tool. After a tool change has been completed and a tool has been set down on the tool spindle, the transfer device is thus moved against the transfer direction into its idle position. The transfer device remains in the idle position until another tool change is carried out. In the event of a tool change it is moved from there to the tool spindle in order to receive from the tool spindle a tool that is to be exchanged. The idle position can coincide with the intermediate position.

According to a further advantageous embodiment of the invention, the idle position of the transfer device is located between the spindle position and the tool change position. The idle position can coincide with the intermediate position.

According to a further advantageous embodiment of the invention, the idle position of the transfer device coincides with the tool change position. After a tool change has been completed and a tool has been set down on the tool spindle, the transfer device is thus moved against the transfer direction into the position located nearest the magazine tool shaft. The transfer device remains in the idle position until another tool change is carried out. In the event of a tool change it is moved from there to the tool spindle in order to receive from the tool spindle a tool that is to be exchanged.

According to a further advantageous embodiment of the invention, the magazine wheels exhibit a transfer position for the tool holders. In this transfer position the tool holder located in the transfer position is arranged immediately adjacent to the tool change position of the transfer device, so that a tool arranged on this tool holder can be set down on the transfer device in the tool change position or a tool arranged on the transfer device can be set down on this tool holder, if this is free. The magazine wheels can be displaceably rotated along the guide rail and together with the magazine shaft around the shaft axis of rotation such that each of the tool holders of the magazine wheels can be moved into the transfer position. Advantageously, exactly one tool holder is located in the transfer position at any one time, so that there cannot be more than one tool holder in the transfer position at the same time.

According to a further advantageous embodiment of the invention, the tool magazine exhibits a number "n" of magazine wheels and a number "m" of tool holders on all "n" magazine wheels. The tool magazine receives a total number of tools of m−n+1. This makes it possible for a tool holder on each magazine wheel always to remain free if a tool is arranged on the transfer device or on the tool spindle.

According to a further advantageous embodiment of the invention, on each of the magazine wheels a tool holder is always free of a tool when a tool is arranged on the transfer device or on the tool spindle. Thus, a free tool holder is always available on each of the magazine wheels in order to set the tool originally arranged on the tool spindle down on a magazine wheel in the case of a tool change and subsequently remove another tool from the same magazine wheel.

According to a further advantageous embodiment of the invention, the tool magazine is equipped with a linear drive that moves the magazine carriage along the guide rail.

According to a further advantageous embodiment of the invention, the magazine wheels are arranged parallel to one another on the magazine shaft. From the magazine shaft the tool holders are arranged in a radial direction to the magazine wheels.

According to a further advantageous embodiment of the invention, the tool magazine is equipped with at least three magazine wheels, whereby the distance between each two adjacent magazine wheels is the same.

According to a further advantageous embodiment of the invention, the magazine shaft is received in at least one pivot bearing and supported by the magazine carriage. The magazine shaft is thus held securely and reliably to the magazine carriage. A pivot bearing supported by the magazine carriage can also be provided between two magazine wheels.

According to a further advantageous embodiment of the invention, the tool holders of the magazine wheels receive the tools together with a tool module, whereby in each tool module is arranged a tool together with a coolant distributor. A tool module with tool and coolant distributor facilitates the arrangement on the tool spindle of the tools equipped with coolant distributor.

According to a further advantageous embodiment of the invention, the magazine shaft is oriented essentially parallel to the guide rail.

According to a further advantageous embodiment of the invention, each tool holder picks up exactly one tool such that the tool is oriented with its tool axis parallel to the magazine shaft.

According to a further advantageous embodiment of the invention, the transfer device is arranged on the machine base so as to be linearly displaceable along the transfer axis essentially perpendicular to the guide rail. The transfer direction and guide rail thus run perpendicular to each other.

According to a further advantageous embodiment of the invention, the magazine shaft is oriented essentially parallel to the tool spindle.

The method according to the invention having the features of claim 16 is characterised in that a first tool arranged on a tool spindle is exchanged quickly and easily with a second tool arranged on a tool holder of a magazine wheel. Each magazine wheel of the tool magazine exhibits a free tool holder. In the performance of the method the magazine wheel containing the second tool is brought with its free tool holder into a transfer position. The tool holder in the transfer position is located immediately by the tool change position of the transfer device. In the interim the transfer device is moved towards the tool spindle so that the transfer device is in the spindle position. In this spindle position the transfer device is immediately by the tool spindle. The transfer device then takes over the first tool arranged on the tool spindle. Subsequently the transfer device together with the first tool is moved in the direction opposite the transfer direction into its tool change position. The transfer device equipped with the first tool and in the tool change position and the free tool holder of the magazine wheel containing the second tool are now located in the transfer position. In this position the first tool and the free tool holder are immediately opposite each other. The transfer device sets the first tool down on the free tool holder, so that the transfer device becomes free and the tool holder free until then is equipped with the first tool. The magazine shaft is then rotated together with all magazine wheels until the second tool is located in the transfer position. Subsequently the second tool is set down on the transfer device, so that the tool holder that had until then contained the second tool becomes free and the transfer device is equipped with the second tool. The transfer device with the second tool is then moved in the transfer direction away from the magazine shaft and the magazine wheels and towards the tool spindle. When the transfer device reaches the spindle position, it sets the second tool down on the tool spindle. The tool change is then complete.

According to a further advantageous embodiment of the invention, between setting the first tool down on a tool holder and picking up the second tool the transfer device is initially moved in the transfer direction away from the magazine shaft and remains in an intermediate position between the tool change position and the spindle position. The magazine shaft is then rotated until the second tool is located in the transfer position. The transfer device is subsequently moved back into the tool change position in order to pick up the second tool from the tool holder. The movement of the transfer device into the intermediate position removes the transfer device from the magazine wheel, so that the rotation of the magazine wheels is not impaired by the transfer device. The removal of the transfer device from the magazine wheels is in particular an advantage if the distance between the magazine wheels is less than the elongation of the transfer device in the direction of the shaft axis of rotation.

According to a further advantageous embodiment of the invention, the setting down of the first tool from the tool spindle onto the transfer device and the movement of the transfer device away from the tool spindle in the direction of the magazine shaft take place simultaneously with the movement of the magazine wheel containing the second tool and the arrangement of the free tool holder of this magazine wheel in the transfer position. The tool change process is thereby accelerated. Thus, it takes no more time to change a tool than with a tool magazine having only one magazine wheel.

According to a further advantageous embodiment of the invention, after the second tool has been set down on the tool spindle the transfer device is moved in the direction opposite the transfer direction and arranged in an idle position at a distance from the tool spindle. The transfer device remains in the idle position until another tool change is carried out. The idle position is located at a distance from the tool spindle, so that the transfer device does not impair the machining of a workpiece with the tool spindle.

Further advantages and advantageous embodiments of the invention can be obtained from the following description, the drawing and the claims.

DRAWING

The drawing shows a model embodiment of the invention which is described below. Illustrations.

DESCRIPTION OF THE MODEL EMBODIMENT

FIGS. 1 to 10 show a tool magazine 1 which is arranged on a machine tool 2. The machine tool 2 exhibits a tool spindle 3 which is driven to rotation around a spindle axis 4. The tool magazine 1 exhibits a guide rail 5 which is arranged on a machine base 6 shared with the machine tool 2. The tool magazine 1 further comprises a magazine carriage 7 which is arranged so as to be linearly displaceable on the guide rail 5. The guide rail 5 prescribes the linear axis along which the magazine carriage 7 can be displaced. On the magazine carriage 7 are arranged a rotary drive 8, a magazine shaft 9 and three magazine wheels 10, 11, 12. The rotary drive 8 drives the magazine shaft 9 to a rotation around its shaft axis of rotation 13. The shaft axis of rotation 13 is parallel to the guide rail 5. The three magazine wheels 10, 11, 12 are non-rotatably arranged on the magazine shaft 9, so that in the event of a rotation of the magazine shaft 9 around its shaft axis of rotation 13 all three magazine wheels 10, 11, 12 are likewise rotated around the shaft axis of rotation 13. Each of the three magazine wheels 10, 11, 12 is equipped with six tool holders 14. In FIGS. 1 to 4 one tool holder of each six tool holders per magazine wheel 10, 11, 12 is free. In FIGS. 1 to 4 a further tool is arranged on the transfer device. A tool holder is free if no tool is arranged on it. In FIGS. 1 to 4 grinding wheels are arranged as tools 15 on the other tool holders. Each of the grinding wheels is arranged together with a coolant distributor 16 on a tool module 17. The tool modules 17 are arranged on the tool holders 14 of the magazine wheels 10, 11, 12.

Figure 5:
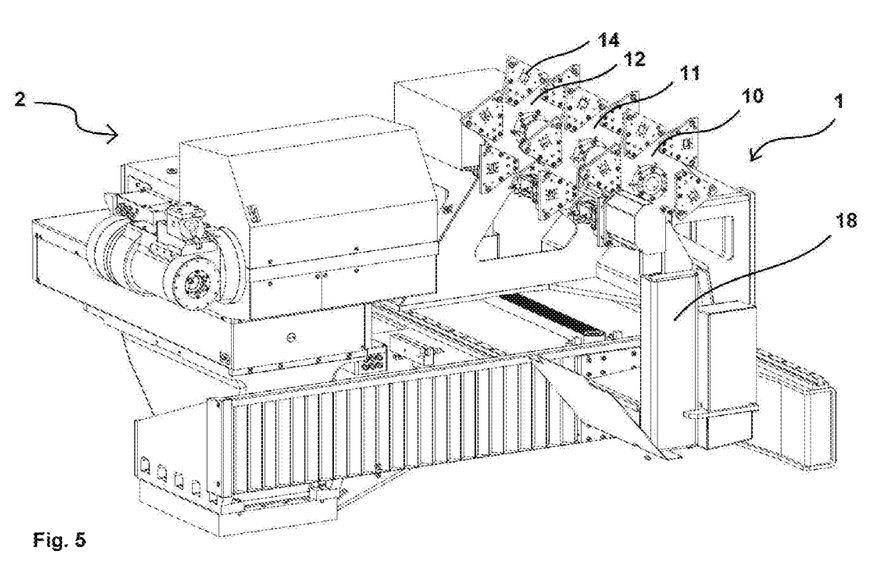
Figure 6:
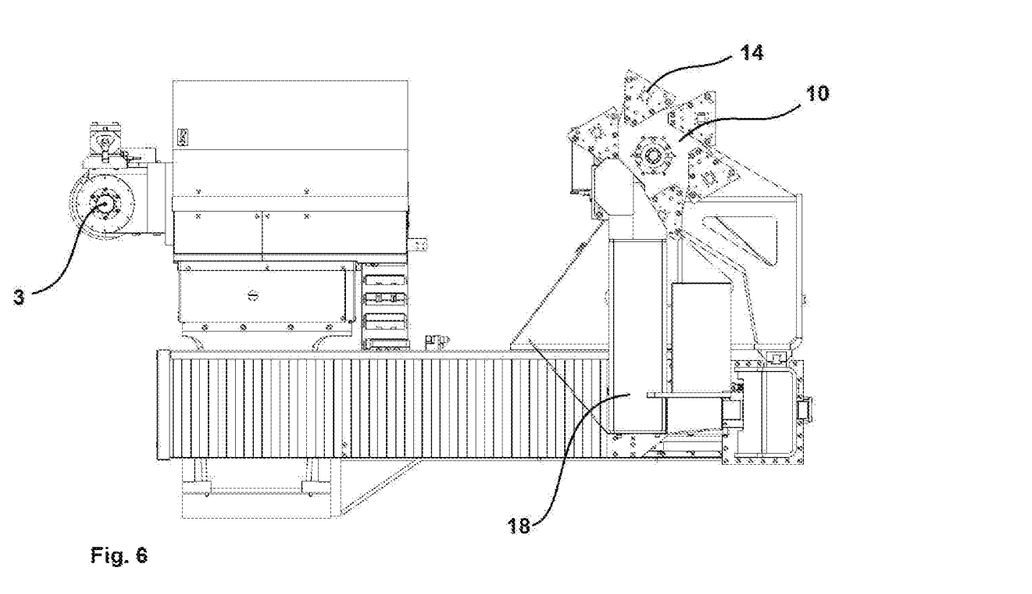
Figure 7:
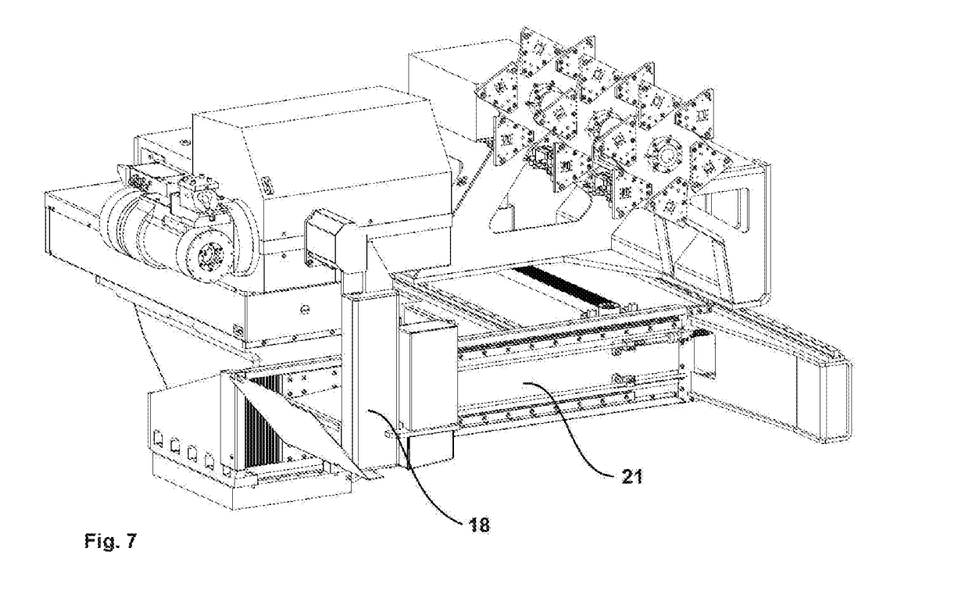
Figure 8:
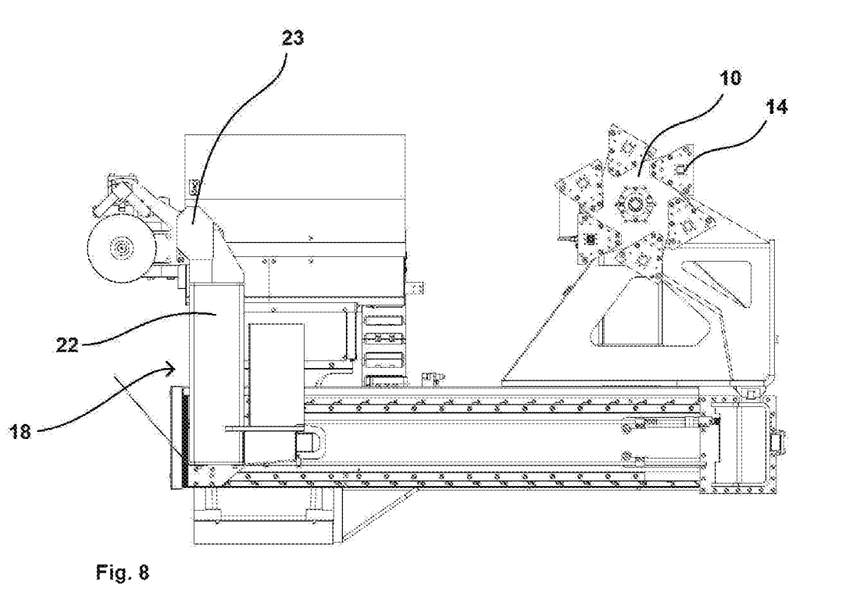
Figure 9:
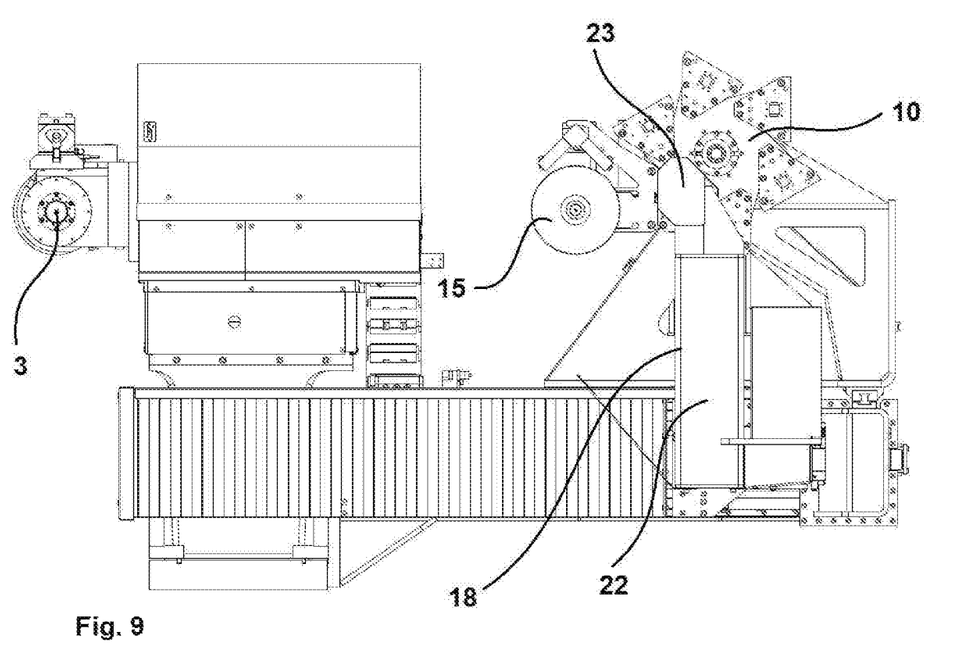
Figure 10:
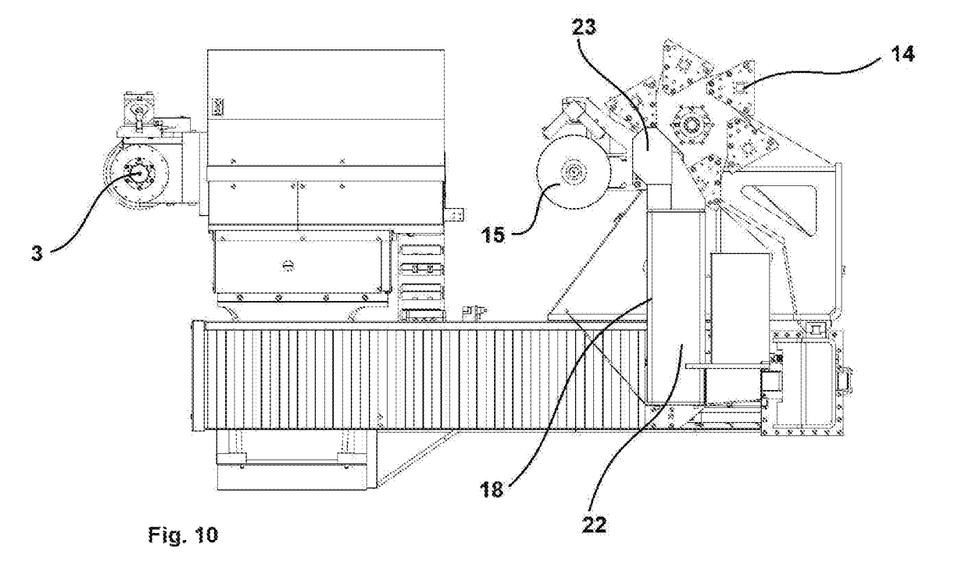

For a better overview, in FIGS. 5 to 10 all tool holders 14 of the magazine wheels 10, 11, 12 are free of tools. The magazine wheels 10, 11, 12 and the tool holders 14 of the magazine wheels 10, 11, 12 are thus easier to identify. In FIGS. 5 to 7 the transfer device is also free of any tool. In FIGS. 8 to 10 a tool 15 is arranged on the transfer device.

The shaft axis of rotation 13, the guide rail 5 and the spindle axis 4 run in parallel. The grinding wheels are arranged on the magazine wheels 10, 11, 12 such that the tool axes of the grinding wheels are oriented parallel to the spindle axis. The tool axes remain oriented parallel to the spindle axis 4 even while they are being transported from the magazine wheels 10, 11, 12 to the tool spindle 3 and back again. Since in the model embodiment represented the shaft axis of rotation 13 and the guide rail 5 are parallel to the spindle axis 4, the tool axis of the grinding wheels also runs parallel to the shaft axis of rotation 13 and to the guide rail 5.

A transfer device 18 is arranged linearly displaceably on the machine base 6. The linear axis along which the transfer device 18 can be displaced in and against a transfer direction 20 runs perpendicular to the spindle axis 4 of the guide rail 5 and the shaft axis of rotation 13. It is referred to as the transfer axis 19. For the linear displacement along the transfer axis 19, the machine base 6 is equipped with a transfer device guide rail 21 on which the transfer device is displaceably mounted. The transfer device 18 exhibits an upwardly oriented transfer arm 22 and a holding device 23 arranged thereon for a tool 25.

Figure 1:
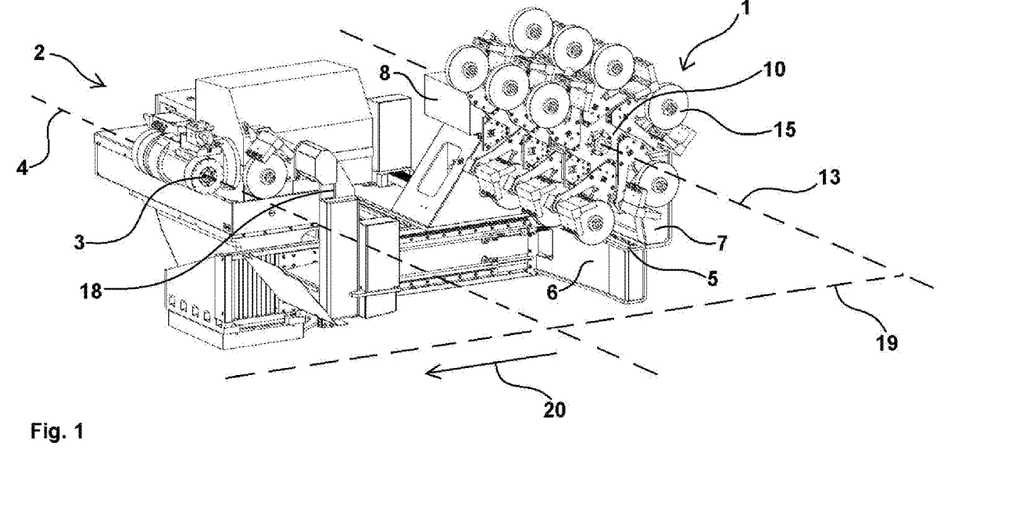
FIG. 1 Machine tool with tool spindle and tool magazine in a perspective view FIG. 2 Machine tool with tool spindle and tool magazine according to FIG. 1 in a view from the front FIG. 3 Machine tool with tool spindle and tool magazine according to FIG. 1 in a view from above FIG. 4 Machine tool with tool spindle and tool magazine according to FIG. 1 in a view from the side FIG. 5 Machine tool with tool spindle and tool magazine according to FIG. 1, whereby the tool magazine including the transfer device is free of tools and the transfer device is located on the magazine wheels FIG. 6 Machine tool according to FIG. 5 in a view from the front FIG. 7 Machine tool according to FIG. 5, whereby the transfer device is located between the tool spindle and the magazine wheels FIG. 8 Machine tool according to FIG. 5 with a tool on the transfer device, whereby the transfer device is located in a spindle position FIG. 9 Machine tool according to FIG. 8, whereby the transfer device is in a tool change position FIG. 10 Machine tool according to FIG. 8, whereby the transfer device is located in an intermediate position
Figure 2:
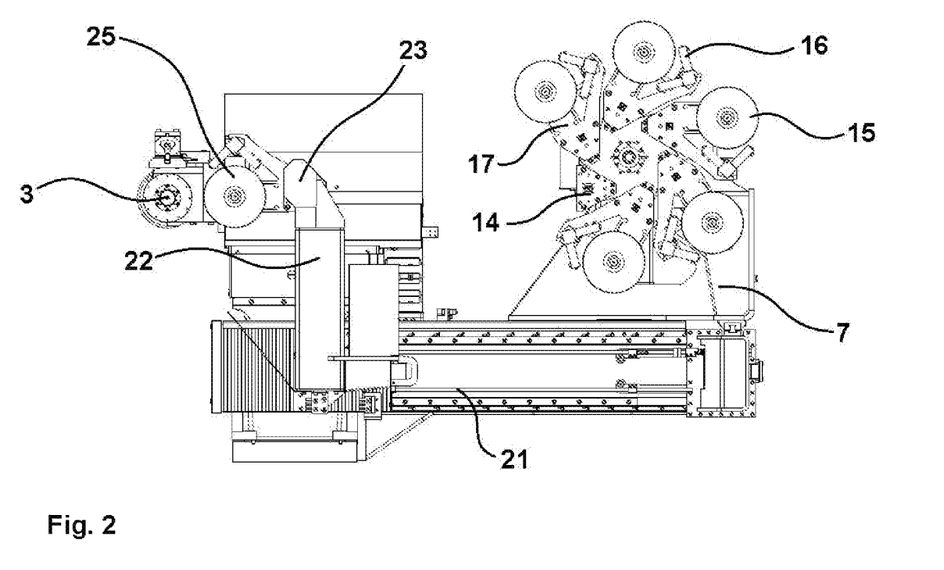

The transfer device 18 transports tools 15, 25 from the magazine wheels 10, 11, 12 to the tool spindle 3 and back again. To that end it is moved back and forth along the transfer axis 19 between a spindle position immediately by the tool spindle and a tool change position immediately by the magazine wheels 10, 11, 12. FIGS. 1 and 2 show the transfer device 18 in a position close to the tool spindle 3. On the holding device 23 is arranged a tool 25 which was taken from the tool spindle 3.

The holding device 23 projects beyond the transfer arm 22 in the direction of the tool spindle 3. The result of this is that in its movement between the spindle position and the tool change position the transfer device 18 does not project beyond the spindle axis 4 in the direction facing away from the tool magazine 1. This side facing away from the tool magazine is therefore available for other components of the machine tool. For example, a fixture for changing and/or holding a workpiece to be machined with the tool spindle can be arranged on this side of the spindle axis that faces away from the tool magazine 1. In this way any interaction between the tool magazine and such other components of the machine tool can be precluded. Thus, a tool change and a workpiece change can take place simultaneously.

Figure 3:
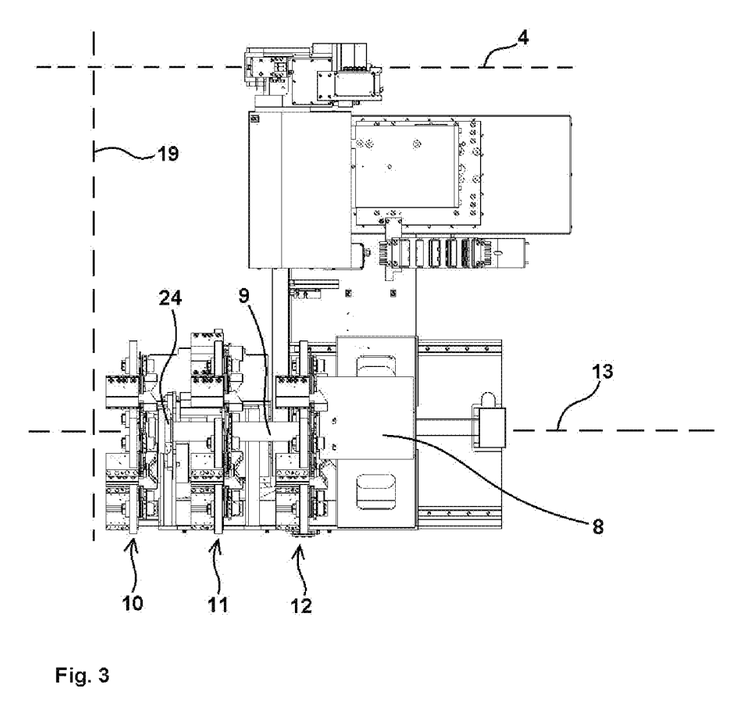

FIG. 3 shows the tool magazine 1 and the machine tool 2 with tool spindle 3 in a view from above. The transfer device is not represented in FIG. 3. It can be seen in this representation that the magazine shaft 9 is received with its one end in the rotary drive 8 and is also supported by a pivot bearing 24. This is located between the magazine wheel 10, which exhibits the greatest remove from the rotary drive 8, and the middle magazine wheel 11. It can further be seen in the representation that the three magazine wheels 10, 11, 12 are parallel to one another and exhibit the same distance from one another.

Figure 4:
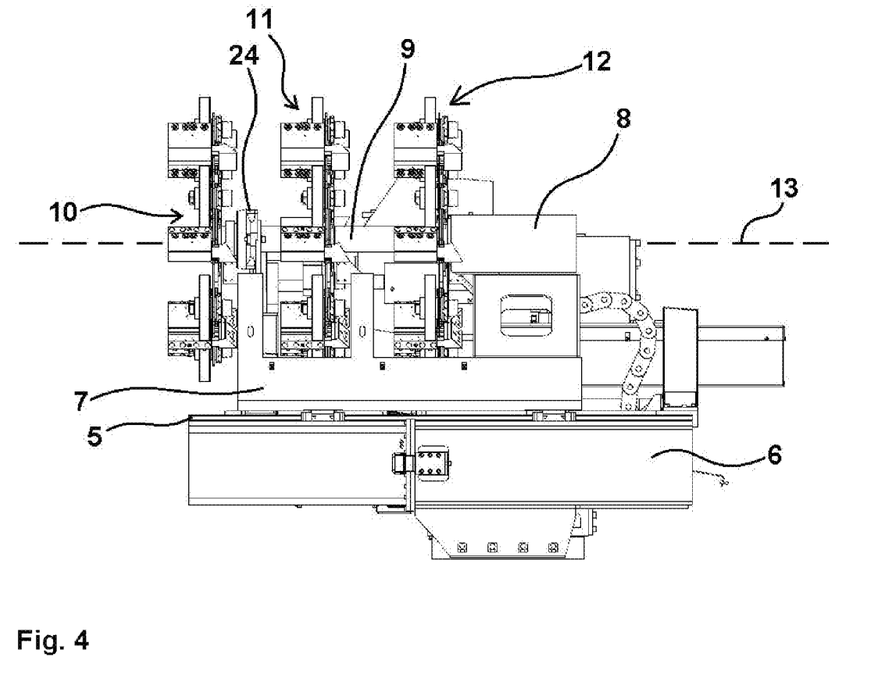

FIG. 4 shows the tool magazine 1 and the machine tool 2 in a side view. It can be seen in this representation also that the magazine wheels 10 and 11 have the same distance from one another as the two magazine wheels 11 and 12 and that the magazine wheels 10, 11, 12 are arranged parallel to one another and perpendicular to the magazine shaft 9.

In the case of machine tool 2, a workpiece mount not represented in the drawing is arranged in front of the tool spindle 3. A workpiece to be machined with the tool spindle is arranged in the workpiece mount. This workpiece is likewise not represented in the drawing. In order to be able to orient the workpiece at various angles against the tool spindle, the workpiece mount is generally arranged moveably around several axes on the machine base. For this reason the workpiece mount takes up a certain amount of space in front of the tool spindle. This space taken up by the workpiece mount is greater in the direction of the spindle axis 4 than the space taken up by the tool magazine in the direction of the shaft axis of rotation 13. The tool magazine thus does not project beyond the machine tool in a direction parallel to the spindle axis. The workpiece mount is arranged together with the tool spindle in a housing not represented in the drawing. This housing also encompasses the tool magazine. The representation according to FIG. 4 shows that the tool magazine does not take up any more space in a housing of the machine tool having the outer dimensions of a machine housing than a machine tool with a known tool magazine with magazine wheel.

FIGS. 8 to 10 show the various end positions of the transfer device 18. The transfer device 18 is halted in these end positions, so that the transfer device remains in these end positions for a certain time. FIG. 8 shows the transfer device in an end position that is referred to as the spindle position. In this position the transfer device 18 is located immediately by the tool spindle 3, so that a tool, in the model embodiment a grinding wheel, between the tool spindle and the holding device 23 of the transfer device 18 can be exchanged.

FIG. 9 shows the transfer device 18 in an end position that is referred to as the tool change position. In this position the transfer device is in the position located nearest the shaft axis of rotation 13 of the magazine shaft 9. In the tool change position a tool can be exchanged between the transfer device and one of the magazine wheels 10, 11, 12. The exchange takes place between the tool holder located in the transfer position and the holding device of the transfer device.

FIG. 10 shows the transfer device in a position that is referred to as the intermediate position. In the intermediate position the transfer device is located between the tool change position according to FIG. 9 and the spindle position according to FIG. 8. The distance between the intermediate position and the tool change position is minimal. In the intermediate position the transfer device is displaced in the direction of the tool spindle 3 until the magazine wheels 10, 11, 12 can be rotated around the shaft axis of rotation without the rotation being impaired by the transfer device or a tool arranged on the transfer device.

The process of a tool change is explained with reference to FIG. 2.

The tool 25 recently arranged on the tool spindle 3 and referred to below as the first tool is to be exchanged for the tool 15 of the magazine wheel 10. The tool 15 of the magazine wheel 10 is referred to below as the second tool. The magazine wheel 10 containing the tool 15 is brought into a transfer position with its free tool holder 14. The tool holder 14 in the transfer position is located immediately by the tool change position of the transfer device 18. In the interim the transfer device 18 is moved towards the tool spindle 3 so that the transfer device is in the spindle position. In this spindle position the transfer device 18 is immediately by the tool spindle 3. The transfer device 18 then takes over the first tool 25 arranged on the tool spindle 3. Subsequently the transfer device together with the first tool 25 is moved in the direction opposite the transfer direction 20 into its tool change position. The transfer device 18 equipped with the first tool 25 and in the tool change position and the free tool holder 14 of the magazine wheel 10 containing the second tool 15 are now located in the transfer position. In this position the first tool 25 and the free tool holder 14 are immediately opposite each other. The transfer device 18 sets the first tool 25 down on the free tool holder 14, so that the transfer device 18 becomes free and the tool holder 14 free until then is equipped with the first tool 25. The transfer device is then moved into the intermediate position, so that the magazine shaft 9 together with all magazine wheels 10, 11, 12 can rotate unhindered. The magazine shaft 9 and the magazine wheels 10, 11, 12 are rotated until the second tool 15 is located in the transfer position. Subsequently the second tool 15 is set down on the transfer device 18, so that the tool holder that had until then contained the second tool becomes free and the transfer device 18 is equipped with the second tool 15. The transfer device 18 with the second tool 15 is then moved in the transfer direction 20 away from the magazine shaft 9 and the magazine wheels 10, 11, 12 and towards the tool spindle 3. When the transfer device 18 reaches the spindle position, it sets the second tool 15 down on the tool spindle 3. The tool change is then complete.

All features can be material to the invention both individually and in any combination.

REFERENCE NUMBERS

1 Tool magazine
2 Machine tool
3 Tool spindle
4 Spindle axis
5 Guide rail
6 Machine base
7 Magazine carriage
8 Rotary drive
9 Magazine shaft
10 Magazine wheel
11 Magazine wheel
12 Magazine wheel
13 Shaft axis of rotation
14 Tool holder
15 Tool
16 Coolant distributor
17 Tool module
18 Transfer device
19 Transfer axis
20 Transfer direction
21 Transfer device guide rail
22 Transfer arm
23 Holding device
24 Pivot bearing
25 Tool

The invention claimed is:

1. An assembly comprising
a transfer device; and
a tool magazine for receiving a plurality of tools which are provided for arrangement on a tool spindle of a machine tool,
wherein the tool magazine comprises:
a guide rail arranged in a fixed position on a machine base;
a magazine carriage displaceably mounted on the guide rail;
a rotary drive arranged on the magazine carriage and which transmits a torque to a magazine shaft rotatably arranged on the magazine carriage so as to rotate the magazine shaft around a magazine shaft axis of rotation;
at least first and second magazine wheels rotatably arranged on the magazine shaft; and
at least two tool holders on each of the first and second magazine wheels, whereby each tool holder of the at least two tool holders receives exactly one tool;
wherein the magazine shaft is oriented such that the magazine shaft axis of rotation extends parallel to a longitudinal axis of the guide rail;
wherein the transfer device is arranged on the machine base so as to be linearly displaceable along a transfer axis, which extends transversely to the longitudinal axis of the guide rail; and
wherein the transfer device picks up the one tool arranged on one of the at least two tool holders of the first and second magazine wheels, transports the one tool along the transfer axis away from the one of the at least two tool holders and towards the tool spindle and sets the one tool down on the tool spindle, and which picks up a tool arranged on the tool spindle, transports the tool along the transfer axis away from the tool spindle and towards a free tool holder of the at least two tool holders of one of the first and second magazine wheels and sets the tool down on the free tool holder.

2. The assembly according to claim 1, wherein the transfer device has at least two end positions:
a spindle position, in which the transfer device is located in a position nearest the tool spindle and picks up the tool arranged on the tool spindle or sets the one tool down on the tool spindle, and
a tool change position, in which the transfer device picks up the one tool arranged on the one of the at least two tool holders of the first magazine wheel facing the transfer device or sets the tool arranged on the tool spindle down on the free tool holder facing the transfer device of the first magazine wheel,
and wherein the transfer device is linearly displaceable along the transfer axis between the spindle position and the tool change position.

3. The assembly according to claim 2, wherein the transfer device has as a third end position an intermediate position which is located between the spindle position and the tool change position and in which the first and second magazine wheels rotate free of interaction with the transfer device.

4. The assembly according to claim 2, wherein the first and second magazine wheels have a transfer position for the at least two tool holders in which the tool holder of the at least two tool holders located in the transfer position is arranged immediately adjacent to the tool change position of the transfer device such that the one tool arranged on the tool holder of the at least two tool holders located in the transfer position can be set down in the tool change position on the transfer device or a tool arranged on the transfer device can be set down on the tool holder of the at least two tool holders located in the transfer position, if the tool holder of the at least two tool holders located in the transfer position is free, and wherein the first and second magazine wheels are displaceable along the guide rail and together with the magazine shaft are rotatable around the magazine shaft axis of rotation such that each of the at least two tool holders of the first and second magazine wheels can be moved into the transfer position.

5. The assembly according to claim 1, wherein the tool magazine includes "n" number of magazine wheels and between the "n" number of magazine wheels there are in total a number "m" of tool holders, and wherein the tool magazine receives a total number of tools of m=n+1.

6. The assembly according to claim 1, wherein on each of the first and second magazine wheels a tool holder of each of the at least two tool holders is always free of a tool when a tool is arranged on the transfer device or on the tool spindle.

7. The assembly according to claim 1, wherein the tool magazine is equipped with a linear drive which moves the magazine carriage along the guide rail.

8. The assembly according to claim 1, wherein the magazine wheels are arranged parallel to one another on the magazine shaft.

9. The assembly according to claim 1, wherein the tool magazine is equipped with at least first, second, and third magazine wheels and wherein a distance between each two adjacent magazine wheels of the first, second, and third magazine wheels is the same.

10. The assembly according to claim 1, wherein the magazine shaft is received in at least one pivot bearing and is supported on the magazine carriage.

11. The assembly according to claim 1, further comprising a plurality of tool modules, each tool module comprising a tool and a coolant distributor, wherein the at least two tool holders of the first and second magazine wheels receive the plurality of tool modules.

12. The assembly according to claim 1, wherein each tool holder of the at least two tool holders picks up exactly one tool such that the one tool is oriented with a tool axis of the one tool parallel to the magazine shaft.

13. The assembly according to claim 1, wherein the transfer device is arranged on the machine base so as to be linearly displaceable along the transfer axis perpendicular to the guide rail.

14. The assembly according to claim 1, wherein the magazine shaft is oriented parallel to the tool spindle.

15. A method for changing tools on a machine tool with a tool spindle, whereby the machine tool is equipped with the assembly according to claim 1 and at least one free tool holder is provided on each of the first and second magazine wheels, the method comprising the following process steps:
arranging the transfer device in a spindle position in which the transfer device is located in a position nearest the tool spindle;
picking up by the transfer device of a first tool arranged on the tool spindle;
rotating the first and second magazine wheels and/or displacing the magazine carriage such that a free tool holder of the first magazine wheel, which contains a second tool to be arranged on the tool spindle, is located in a transfer position in which the first tool arranged on the transfer device can be set down on the free tool holder;
moving the transfer device along the transfer axis away from the tool spindle into a tool change position in which the transfer device is in a position nearest the first magazine wheel, which contains the second tool, and the transfer device with the first tool and the free tool holder of the first magazine wheel which contains the second tool are immediately opposite one another in the transfer position;
setting down of the first tool, which is arranged on the transfer device onto the free tool holder of the first magazine wheel, which contains the second tool;
rotating the first magazine wheel on which the second tool is arranged until the tool holder with the second tool is located in the transfer position;
setting down of the second tool onto the transfer device;
moving the transfer device along the transfer axis away from the first magazine wheel towards the tool spindle until the transfer device with the second tool is located in the spindle position; and
setting down of the second tool onto the tool spindle.

16. The method according to claim 15, wherein between the setting down of the first tool and the picking up of the second tool, the transfer device is moved along the transfer axis away from the magazine shaft into an intermediate position, then the magazine shaft is rotated until the second tool is located in the transfer position and the transfer device is subsequently moved back into the tool change position in order to pick up the second tool from the tool holder.

17. The method according to claim 15, wherein the setting down of the first tool from the tool spindle onto the transfer device and the movement of the transfer device away from the tool spindle in the direction of the magazine shaft take place simultaneously with the movement of the first magazine wheel containing the second tool and the arrangement of the free tool holder of the first magazine wheel in the transfer position.

18. The method according to claim 15, wherein after the second tool has been set down on the tool spindle, the transfer device is moved along the transfer axis and is arranged in an idle position which is removed from the tool spindle.

* * * * *

UNITED STATES PATENT AND TRADEMARK OFFICE
CERTIFICATE OF CORRECTION

| | | |
|---|---|---|
| PATENT NO. | : 11,273,529 B2 | Page 1 of 1 |
| APPLICATION NO. | : 16/630910 | |
| DATED | : March 15, 2022 | |
| INVENTOR(S) | : Fabien Picon et al. | |

It is certified that error appears in the above-identified patent and that said Letters Patent is hereby corrected as shown below:

In the Claims

In Column 11, Line 2 please change "m=n+1" to --m-n+1--.

Signed and Sealed this
Twenty-fourth Day of May, 2022

Katherine Kelly Vidal
*Director of the United States Patent and Trademark Office*